United States Patent
Park et al.

(10) Patent No.: US 8,155,066 B2
(45) Date of Patent: Apr. 10, 2012

(54) SCHEDULING APPARATUS AND METHOD FOR PROPORTIONAL RESOURCE ALLOCATION AMONG MOBILE VIRTUAL NETWORK OPERATORS

(75) Inventors: Eun-Chan Park, Seongnam-si (KR); Ki-Back Kim, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 673 days.

(21) Appl. No.: 12/328,748

(22) Filed: Dec. 4, 2008

(65) Prior Publication Data

US 2009/0154415 A1    Jun. 18, 2009

(30) Foreign Application Priority Data

Dec. 18, 2007   (KR) .................. 10-2007-0133800

(51) Int. Cl.
  *H04W 4/00* (2009.01)
  *H04W 72/00* (2009.01)
  *H04J 3/16* (2006.01)
(52) U.S. Cl. ......... 370/329; 370/437; 370/468; 455/450
(58) Field of Classification Search .................. 370/310, 370/319, 328–333, 343–344, 436–437, 441–465, 370/468, 478–480; 455/449–464; 709/225–226, 709/229–244
See application file for complete search history.

(56) References Cited

U.S. PATENT DOCUMENTS

| | | | | |
|---|---|---|---|---|
| 6,137,787 A | * | 10/2000 | Chawla et al. ............... | 370/337 |
| 2005/0249114 A1 | * | 11/2005 | Mangin et al. ............... | 370/229 |
| 2005/0260997 A1 | * | 11/2005 | Korale et al. ............... | 455/452.2 |
| 2007/0197228 A1 | * | 8/2007 | McGary et al. ............... | 455/445 |
| 2009/0017809 A1 | * | 1/2009 | Jethi et al. ............... | 455/418 |
| 2009/0040983 A1 | * | 2/2009 | Kim et al. ............... | 370/331 |
| 2009/0154413 A1 | * | 6/2009 | Kim et al. ............... | 370/329 |
| 2010/0312612 A1 | * | 12/2010 | Carr et al. ............... | 705/10 |

FOREIGN PATENT DOCUMENTS

| | | |
|---|---|---|
| EP | 1 220 557 A1 | 7/2002 |
| KR | 10-2001-0015251 A | 2/2001 |
| KR | 10-2003-0087567 A | 11/2003 |

\* cited by examiner

*Primary Examiner* — Tri H Phan
(74) *Attorney, Agent, or Firm* — Jefferson IP Law, LLP

(57) ABSTRACT

A scheduling apparatus and method for proportional resource allocation among Mobile Virtual Network Operators (MVNOs) are provided. The method includes, for each MVNO, allocating a dedicated resource of each MVNO to Quality of Service (QoS) traffic in consideration of priorities, for each MVNO, determining a presence or absence of unscheduled QoS traffic, and for MVNOs each of which has the unscheduled QoS traffic, allocating a common resource shared by all MVNOs to the unscheduled QoS traffic in consideration of priorities without distinguishing each MVNO. Accordingly, proportional resource allocation depending on a pre-set ratio can be guaranteed, efficiency of resource use can be improved, and QoS can be guaranteed.

30 Claims, 3 Drawing Sheets

SCHEDULING APPARATUS AND METHOD FOR PROPORTIONAL RESOURCE ALLOCATION AMONG MOBILE VIRTUAL NETWORK OPERATORS

PRIORITY

This application claims the benefit under 35 U.S.C. §119(a) of a Korean patent application filed in the Korean Intellectual Property Office on Dec. 18, 2007 and assigned Serial No. 10-2007-0133800, the entire disclosure of which is hereby incorporated by reference.

BACKGROUND OF THE INVENTION

1. Field of the Invention

The present invention relates to scheduling. More particularly, the present invention relates to a scheduling apparatus and method for proportional resource allocation among Mobile Virtual Network Operators (MVNOs).

2. Description of the Related Art

With advances in communication technology, there is a worldwide trend toward a wireless network. A single physical network operated by a plurality of Virtual Network Operators (VNOs), each of which is located in a Core Service Network (CSN), is assumed in such a wireless network. A VNO is a service provider that provides a service by configuring a virtual Access Service Network (ASN) through a Network Access Provider (NAP). The ASN denotes a physical network consisting of an Access Service Network-Gateway (ASN-GW) and a Base Station (BS). The NAP denotes a service provider that owns and operates the ASN. For example, the NAP may be a mobile communication service provider. One NAP may include several ASNs.

Unlike a wired network, air resources are significantly limited in a wireless network. Further, the wireless network has a characteristic in which radio capacity itself is variable and unpredictable. Accordingly, there is a need to propose a flexible and optimized scheduling method for coping with the worldwide trend by considering such a characteristic of the wireless network.

SUMMARY OF THE INVENTION

An aspect of the present invention is to address at least the above-mentioned problems and/or disadvantages and to provide at least the advantages described below. Accordingly, an aspect of the present invention is to provide a scheduling apparatus and method for proportional resource allocation among Mobile Virtual Network Operators (MVNOs).

Another aspect of the present invention is to provide a scheduling apparatus and method for guaranteeing proportional resource allocation according to a pre-set ratio by distinguishing a dedicated resource and a common resource for each MVNO, for improving efficiency of resource use, for guaranteeing Quality of Service (QoS) by allocating resources in consideration of priorities, and for compensating for proportional allocation by introducing a borrow value.

In accordance with an aspect of the present invention, a method for scheduling proportional resource allocation among MVNOs is provided. The method includes, for each MVNO, allocating a dedicated resource of each MVNO to QoS traffic in consideration of priorities, for each MVNO, determining a presence or absence of unscheduled QoS traffic, and for MVNOs each of which has the unscheduled QoS traffic, allocating a common resource shared by all MVNOs to the unscheduled QoS traffic in consideration of priorities without distinguishing each MVNO.

In accordance with another aspect of the present invention, an apparatus for scheduling proportional resource allocation among MVNOs is provided. The apparatus includes a Connection Admission Control (CAC) processor for determining whether to admit new calls or handover calls, and a scheduler, only with respect to admitted calls, for allocating for each MVNO a dedicated resource of each MVNO to QoS traffic in consideration of priorities, for determining for each MVNO a presence or absence of unscheduled QoS traffic, and for allocating for MVNOs, each of which has the unscheduled QoS traffic, a common resource shared by all MVNOs to the unscheduled QoS traffic in consideration of priorities without distinguishing each MVNO.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
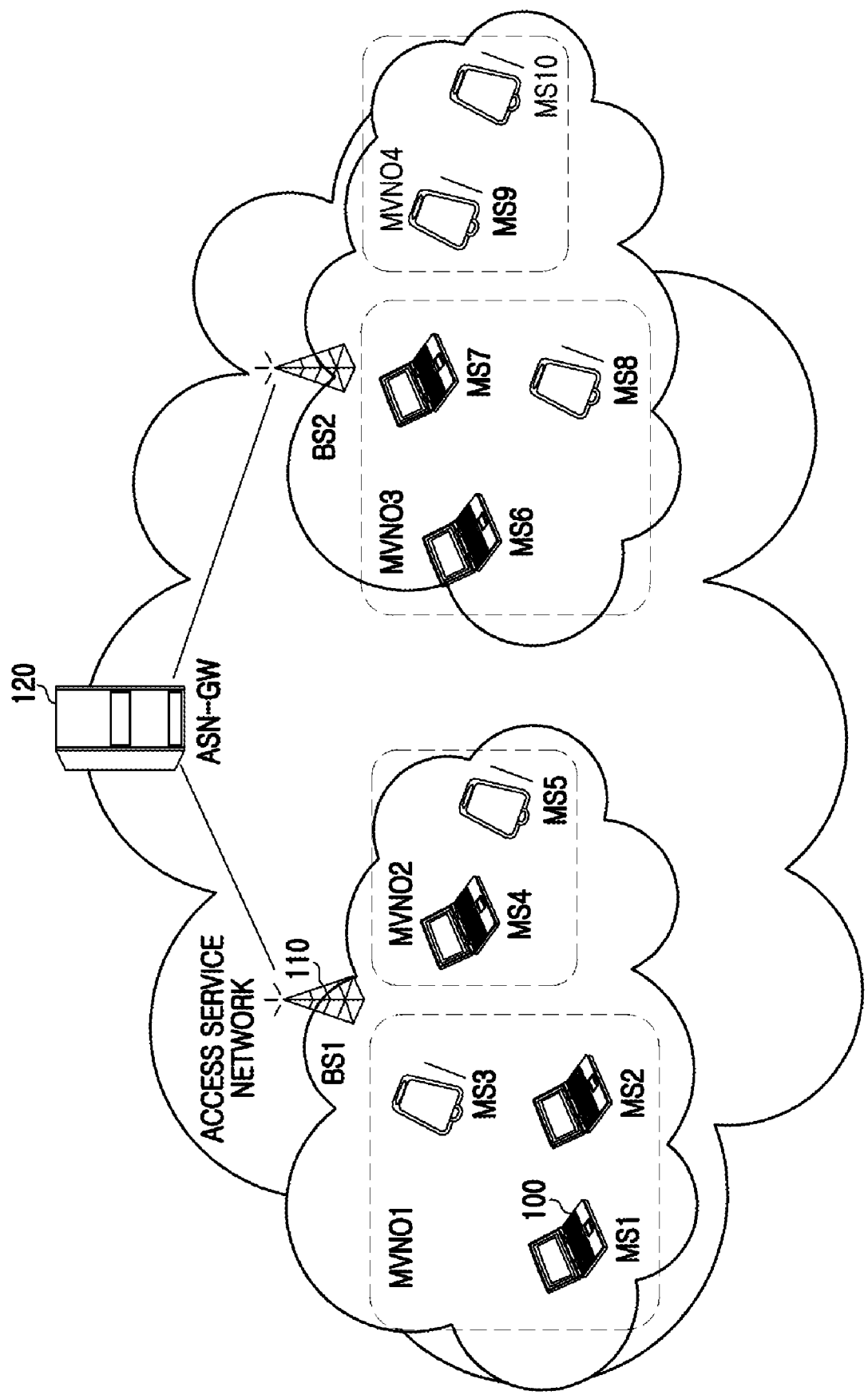
FIG. 1 is a block diagram illustrating a network configuration according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an exemplary scheduling apparatus and method for proportional resource allocation among Mobile Virtual Network Operators (MVNOs) will be described.

Exemplary embodiments of the present invention will be described under the following assumptions. First, a Connection Admission Control (CAC) processor and a scheduler of a Base Station (BS) can distinguish to which MVNO specific traffic (e.g. signaling traffic, bearer traffic, etc.) belongs. Second, a type of traffic served by each MVNO varies according to a Quality of Service (QoS) class (e.g., Unsolicited Grant Service (UGS), Real Time-Variable Rate (RT-VR), Best Effort (BE), etc.). Such traffic is classified into a QoS traffic and a non-QoS traffic (i.e., BE traffic). As to the QoS traffic, it is assumed that CAC is applied according to a service ratio.

According to an exemplary scheduling method of the present invention, an individual scheduling method for each MVNO and an integrated scheduling method, in which MVNOs are combined in scheduling without distinction, can be considered. In the integrated scheduling method, scheduling is performed for specific traffic without considering proportional allocation for each MVNO in order to decrease complexity of the scheduler and to focus on effective resource allocation. In this case, it is assumed that proportional allocation of air resources is satisfied on average by performing the CAC.

According to a scheduling method applied to each item of traffic, the following four cases can be considered.
(1) Scheduling for Each MVNO
   For all traffic, scheduling for each MVNO is individually performed using proportional allocation.
(2-1) Integrated Scheduling I: QoS Service Flow and BE are Distinguished
   For QoS traffic (i.e., UGS, Extended Real Time-variable Rate (ERT-VR), RT-VR, and None Real Time-Variable Rate (NRT-VR)), integrated scheduling is applied, and for BE traffic, air resources remaining after the integrated scheduling is performed are subjected to scheduling for each MVNO using proportional allocation.
(2-2) Integrated Scheduling II: Real Time Traffic and Non-real Time Traffic are Distinguished
   For real time traffic (i.e., UGS, ERT-VR, and RT-VR), integrated scheduling is applied, and for non-real time traffic, remaining air resources are subjected to scheduling for each MVNO using proportional allocation.
(2-3) Integrated Scheduling III: UGS & ERT-VR Traffic and Other Traffic are distinguished
   For UGS & ERT-VR traffic, integrated scheduling is applied, and for other traffic, remaining resources are subjected to scheduling for each MVNO using proportional allocation.

In the case of (2-1), (2-2), and (2-3) above and according to an exemplary embodiment of the present invention, proportional allocation is performed on air resources remaining after the integrated scheduling in one of the following two manners. First, proportional allocation may be performed only on resources remaining after the integrated scheduling is performed. Second, an amount of resources allocated to each MVNO may be determined after the integrated scheduling is performed, and then scheduling is performed so that proportional allocation is achieved as a whole when the remaining resources are scheduled.

When scheduling for each MVNO using proportional allocation is performed in the aforementioned four cases, for convenience of the scheduler, a queue for each MVNO can be additionally provided for traffic to which scheduling for proportional allocation is applied. The scheduling for proportional allocation can be performed even if the queue is used in common. In this case, processing capacity increases.

Now, the aforementioned scheduling method for each MVNO using proportional allocation will be described in more detail according to exemplary embodiments of the present invention.

FIG. 1 is a block diagram illustrating a network configuration according to an exemplary embodiment of the present invention.

Referring to FIG. 1, a network includes an Access Service Network-Gateway (ASN-GW) 120, a Base Station (BS) 110, and a Mobile Station (MS) 100. Herein, Network Entities (NEs) are defined according to functions, and thus they may be referred to using other terms depending on a standard group's or operator's intention. For example, the ASN-GW 120 may also be referred to as an Access Control Router (ACR), and the BS 110 may also be referred to as a Radio Access Station (RAS).

The ASN-GW 120 manages subscriber connection and mobility, and allocates a unique service flow for uplink/downlink connection.

The BS 110 is a system located between the ASN-GW 120 and the MS 100. The BS 110 provides an interface with a wireless access conforming to PHYsical (PHY) and Media Access Control (MAC) protocols of a wireless network and thus provides bearer traffic and a connection of wireless areas to a subscriber. Although not shown, the BS 110 includes a CAC processor and a scheduler. The CAC processor determines whether to admit new calls or handover calls and predicts an amount of bandwidth to be allocated to the admitted calls. The scheduler performs scheduling on packets belonging to the admitted calls. The BS 110 includes one or more MVNOs. The scheduler performs scheduling for proportional resource allocation among MVNOs according to exemplary embodiments of the present invention. Although it is shown that the MVNOs are distinguished according to service areas in FIG. 1, the MVNOs can also be logically distinguished without being separated according to the areas. For example, the MVNOs may be distinguished into an MVNO 1 and an MVNO 2 according to specific areas where the MVNOs belong, and instead of using the specific areas to distinguish the MVNOs, the MVNOs may be distinguished into the MVNO 1 and the MVNO 2 according to subscribers who are registered therein.

The MS 100 is an entity that receives an end-to-end service.

Time and frequency are resources in an Orthogonal Frequency Division Multiple Access (OFDMA) system and a resource unit differs depending on a wireless network protocol. For example, in case of a WiMAX system, the resource unit may be a slot, a symbol, and a frame. When resources are allocated in a frame unit, the greater the number of MVNOs, the longer the period of a frame allocated for a specific MVNO. For example, if the resources are allocated in a ratio of MVNO1:MVNO2:MVNO3=1:1:3, an allocation period of the specific MVNO corresponds to 5 frames. When a frame allocation period increases, if an application program in use requires a real-time process such as Voice over Internet Protocol (VoIP), a scheduling interval increases. As a result, a time delay and a jitter increase, which causes deterioration in QoS.

Therefore, a slot or symbol unit is defined as a unit of proportional resource allocation among MVNOs according to exemplary embodiments of the present invention. When resources are allocated in the slot unit, the scheduling interval increases, and thus the problem of deterioration in QoS of real time traffic can be avoided. However, since the number of available slots changes in every frame unit, there is another problem in that the number of available slots is difficult to be determined according to a pre-set ratio. On the other hand, the aforementioned two problems can be avoided to some extent when resources are allocated in the symbol unit. Of course, while the number of available symbols is not fixed, the number does not change as often in comparison with the number of slots. In the following description, the resource allocation unit is assumed to be the symbol unit.

An exemplary resource allocation method of the present invention will be described below.

First, if $\gamma_k$ denotes a resource allocation ratio of a $k^{th}$ MVNO (i.e., $MVNO_k$) and N denotes the number of available symbols in one frame, then the number $N_k$ of dedicated symbols for the $MVNO_k$ is defined as expressed by Equation (1) below. Herein, $$\sum_k (\gamma_k) = 1.$$

$$N_k = N * \gamma_k * \alpha \qquad (1)$$

In Equation (1), $\alpha$ is a constant less than 1. In this case, $$\sum_k (N_k) = N * \sum_k (\gamma_k) * \alpha = N * \alpha < N.$$

Remaining symbols, i.e., $Ns=N*(1-\alpha)$ symbols, are allocated as common symbols shared by all MVNOs. For example, if $\gamma_1:\gamma_2=1:3$ and N=24, the value $\alpha$ can be set to $\alpha=20/24$. Then, an MVNO 1 and an MVNO 2 respectively can use 5 and 15 dedicated symbols and the remaining four symbols can be shared by the MVNO 1 and the MVNO 2.

An exemplary process of determining the values N and $\alpha$ will now be described with reference to FIG. 2.

Figure 2:
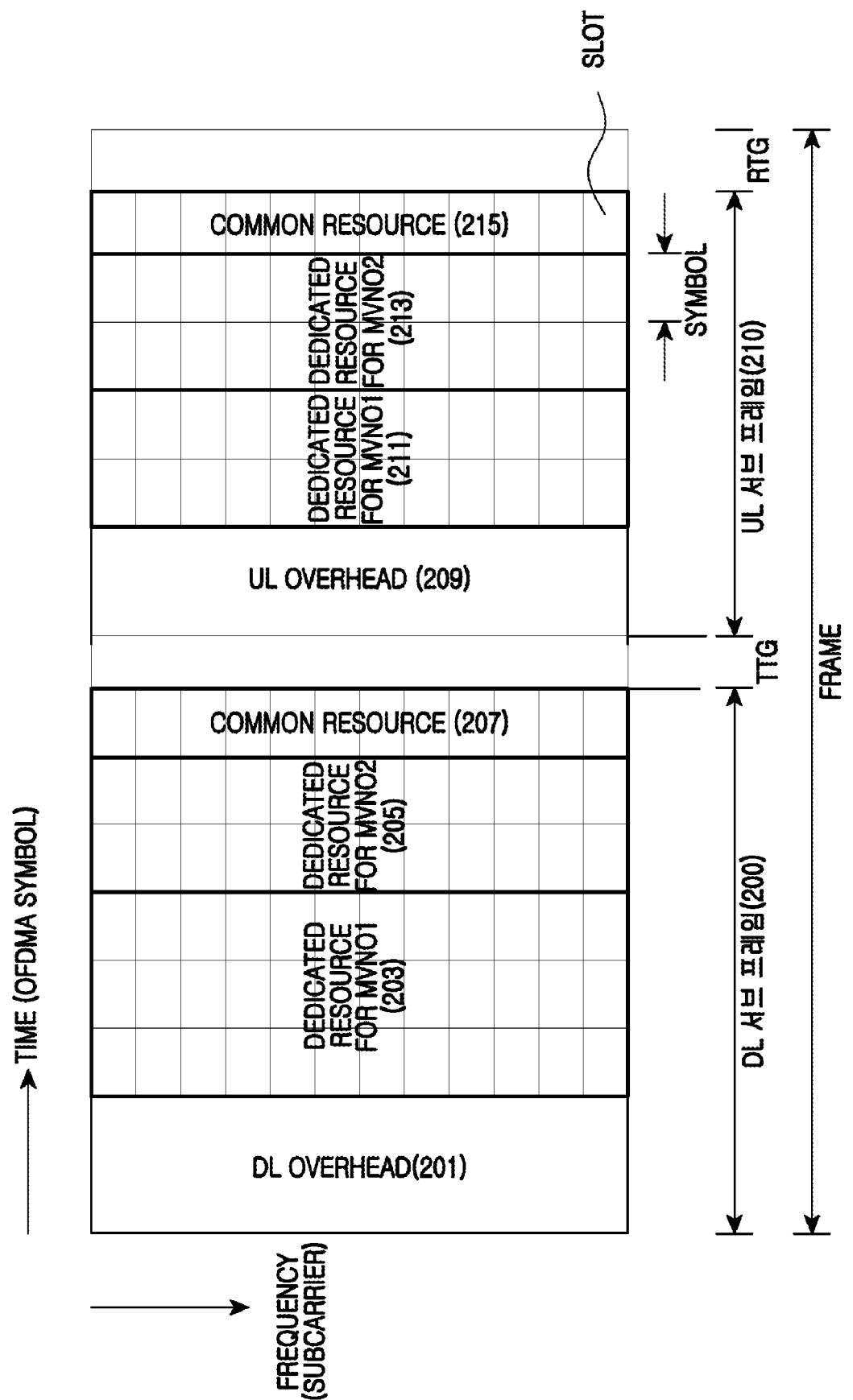
FIG. 2 is a concept diagram illustrating Orthogonal Frequency Division Multiple Access (OFDMA) resource allocation according to an exemplary embodiment of the present invention.

FIG. 2 is a concept diagram illustrating Orthogonal Frequency Division Multiple Access (OFDMA) resource allocation according to an exemplary embodiment of the present invention.

Referring to FIG. 2, in DownLink (DL), the value N is determined by subtracting the number of symbols for a DL overhead 201 from the total number of symbols of a DL subframe 200. The DL overhead 201 includes a preamble and a signaling overhead required for an OFDMA operation irrespective of a presence or absence of a user. An example of the signaling overhead is signaling traffic that transmits a broadcast message. The broadcast message may include a MAP, a Downlink Channel Descriptor (DCD), an Uplink Channel Descriptor (UCD), a Traffic-INDication (TRF-IND), a PAGing-ADVertisement (PAG-ADV), and a NeighBor-ADVertisement (NBR-ADV). A DL resource according to an exemplary embodiment of the present invention is classified into a dedicated resource for a specific MVNO and a common resource 207 for all MVNOs. The dedicated resource includes a dedicated resource 203 for the MVNO1 and a dedicated resource 205 for the MVNO 2.

Likewise, in UpLink (UL), the value N is determined by subtracting the number of symbols for a UL overhead 209 from the total number of symbols of a UL subframe 210. The UL overhead 209 may include a UL control channel allocated irrespective of a presence or absence of a user. Examples of content of the UL control channel include code ranging, a Channel Quality Information CHannel (CQICH), and a Hybrid Automatic Repeat Request (HARQ) ACKnowledgment (ACK). A UL resource according to an exemplary embodiment of the present invention is classified into a dedicated resource for a specific MVNO and a common resource 215 for all MVNOs. The dedicated resource includes a dedicated resource 211 for the MVNO1 and a dedicated resource 213 for the MVNO 2.

The value $\alpha$ is determined by considering changes in an amount of signaling traffic in addition to the DL overhead 201 and the UL overhead 209.

That is, it should be guaranteed that the number $N_k$ of dedicated symbols for the $k^{th}$ MVNO is assigned to the $k^{th}$ MVNO irrespective of changes in the amount of signaling traffic. The number of common symbols may decrease as the amount of signaling traffic increases and the number of common symbols may increase as the amount of signaling traffic decreases.

Figure 3:
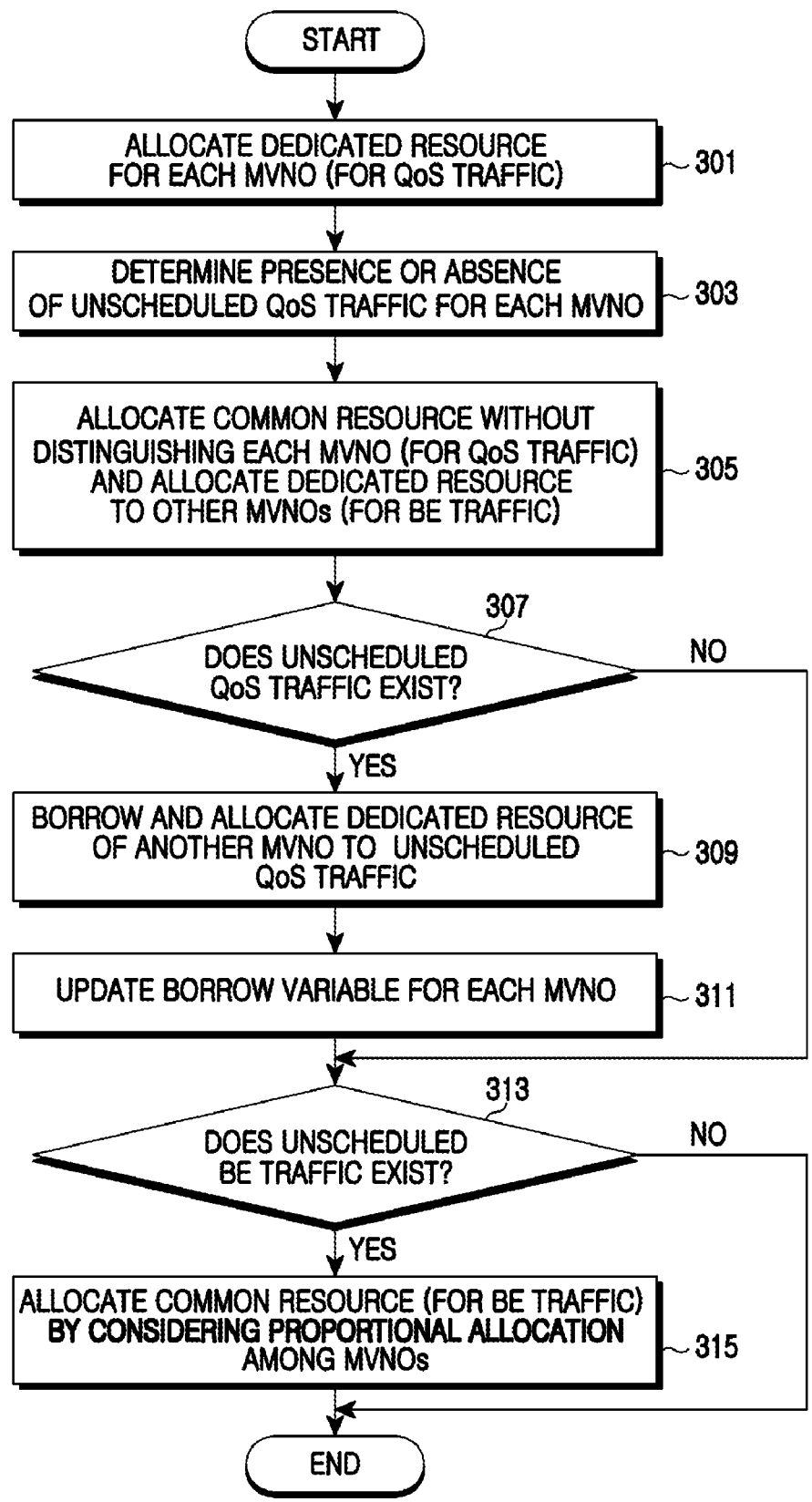
FIG. 3 is a flowchart illustrating a scheduling method for proportional resource allocation among MVNOs in a scheduler of a Base Station (BS) according to an exemplary embodiment of the present invention.

FIG. 3 is a flowchart illustrating a scheduling method for proportional resource allocation among MVNOs in a scheduler of a BS according to an exemplary embodiment of the present invention.

Referring to FIG. 3, in step 301, for each MVNO, the scheduler allocates a specific dedicated resource to specific QoS traffic in consideration of priorities. That is, up to $N_k$ symbols can be allocated for traffic of an $MVNO_k$.

In step 303, for each MVNO, the scheduler determines a presence or absence of unscheduled QoS traffic. In step 305, for MVNOs having the unscheduled QoS traffic, the scheduler allocates common resources in consideration of priorities without distinguishing each MVNO. For other MVNOs not having the unscheduled QoS traffic, for each MVNO, the scheduler allocates a specific dedicated resource to specific BE traffic. For example, after the dedicated resource is allocated to the QoS traffic, if only BE traffic remains in an MVNO1 and QoS traffic having a high priority exists in an MVNO 2, the common resource is allocated preferentially to the QoS traffic of the MVNO 2.

In step 307, the scheduler determines a presence or absence of unscheduled QoS traffic. If the unscheduled QoS traffic does not exist, the procedure proceeds to step 313. Otherwise, if the unscheduled QoS traffic exists, in step 309 the scheduler borrows dedicated resources of other MVNOs having unused dedicated resources and allocates the borrowed resources for the unscheduled QoS traffic. For example, in a case where the MVNO 1 does not entirely use $N_1$ dedicated resources because there is almost no traffic, and QoS traffic to be served further exists in the MVNO 2 even if Ns common resources are entirely used after $N_2$ dedicated resources are all used due to explosive traffic, an unused dedicated resource of the MVNO 1 may be borrowed and allocated to the QoS traffic. In an exemplary implementation, the concept of borrowing the dedicated resource is applied only for the purpose of serving QoS traffic. For example, when the dedicated resource of the MVNO 1 is borrowed to be allocated to traffic of the MVNO 2, the dedicated resource is borrowed only for serving QoS traffic of the MVNO 2 and is not borrowed for serving BE traffic of the MVNO 2. By borrowing the dedicated resource, QoS can be guaranteed for traffic having a high priority.

Although QoS can be guaranteed by borrowing the dedicated resource for the QoS traffic, proportional resource allocation may not be achieved as a result. To prevent this problem, in an exemplary embodiment of the present invention, a borrow variable is defined for each MVNO, and the borrow variable is used to determine whether to borrow the dedicated resource. That is, when a first MVNO borrows a dedicated resource of a second MVNO, a borrow variable of the first MVNO increases by the number of borrowed resources. On the other hand, when the first MVNO lends its dedicated resource to the second MVNO, the borrow variable of the first MVNO decreases by the number of lent resources. In this case, an initial value of the borrow variable is determined by considering the number $N_k$ of dedicated symbols of the first MVNO. The borrow variable is small when an MVNO lends a great number of dedicated resources of the MVNO and the borrow variable is great when an MVNO borrows a great number of dedicated resources of another MVNO. That is, if there are many MVNOs having unused dedicated resources in step 309, the scheduler allocates a dedicated resource of an MVNO having a greatest borrow variable (e.g. largest, highest, etc.) to unscheduled QoS traffic, wherein the MVNO having the greatest borrow variable is an MVNO that has previously borrowed the greatest number of dedicated resources from other MVNOs. By doing so, a borrow variable of each MVNO is approximated to an initial value after a long period of time elapses. That is, dedicated resources which are lent and borrowed among NVNOs can be maintained in balance.

In step 311, the scheduler updates the borrow variable for each MVNO. That is, regarding an MVNO that borrows a dedicated resource of another MVNO, the scheduler increases the borrow variable by the number of borrowed symbols. In addition, regarding an MVNO that lends its dedicated resource, the scheduler decreases the borrow variable by the number of lent symbols.

In step 313, the scheduler determines a presence or absence of unscheduled BE traffic. If the unscheduled BE traffic exists, in step 315, the scheduler allocates common resources, which remain after being allocated to QoS traffic, for BE traffic by considering proportional allocation among MVNOs.

Some MVNOs may lend many dedicated resources since there is almost no QoS traffic. For these MVNOs, the lent dedicated resources may be compensated for. To this end, exemplary embodiments of the present invention additionally provide a compensation mechanism by which proportional resource allocation is also maintained when common resources are allocated by considering a borrow variable. That is, a scheduling weight in inverse proportion to the borrow variable is defined, and the defined scheduling weight is applied when a common resource is allocated to BE traffic. In this case, an MVNO of which the borrow variable is small (that is, an MVNO which lends many dedicated resources) has a great scheduling weight, and an MVNO of which the borrow variable is great has a small scheduling weight. Therefore, by applying the scheduling weight when the common resource is allocated to the BE traffic in step 315, the scheduler can preferentially serve the MVNO of which the borrow variable is small (that is, the MVNO which lends many dedicated resources) and thereafter serve the MVNO of which the borrow variable is great (that is, the MVNO which borrows many dedicated resources).

In an exemplary implementation, a minimum value (e.g., 0) and a maximum value (e.g., 2*initial value) of the borrow variable are determined to be a suitable value to provide a constraint that dedicated resources are not excessively lent or borrowed. In addition, in consideration of a condition where an error occurs in the borrow variable or other abnormal conditions, the borrow variable is initialized to the initial value for all MVNOs according to a specific period (e.g., every one hour or every day).

Thereafter, the procedure of FIG. 3 ends.

According to exemplary embodiments of the present invention, a scheduling apparatus and method for proportional resource allocation among MVNOs are provided. Therefore, proportional resource allocation depending on a pre-set ratio can be guaranteed, efficiency of resource use can be improved, QoS can be guaranteed by allocating resources in consideration of priorities, and proportional allocation can be guaranteed by introducing a borrow variable.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for scheduling proportional resource allocation among Mobile Virtual Network Operators (MVNOs), the method comprising:
   for each MVNO, allocating a dedicated resource of each MVNO to Quality of Service (QoS) traffic in consideration of priorities;
   for each MVNO, determining a presence or absence of unscheduled QoS traffic; and
   for MVNOs each of which has the unscheduled QoS traffic, allocating a common resource shared by all MVNOs to the unscheduled QoS traffic in consideration of priorities without distinguishing each MVNO.

2. The method of claim 1, further comprising, for remaining MVNOs each of which does not have the unscheduled QoS traffic, allocating a dedicated resource of each remaining MVNO to Best Effort (BE) traffic for each remaining MVNO.

3. The method of claim 2, further comprising, if further unscheduled QoS traffic exists, borrowing and allocating dedicated resources of other MVNOs having unused dedicated resources to the unscheduled QoS traffic in consideration of priorities.

4. The method of claim 3, further comprising, after the borrowing and allocating of the dedicated resources, updating a borrow variable for each MVNO by increasing the borrow variable by the number of borrowed resources as to an MVNO that borrows the dedicated resources of other MVNOs and by decreasing the borrow variable by the number of lent resources as to an MVNO that lends a dedicated resource of that MVNO.

5. The method of claim 4, wherein, in the borrowing and allocating of the dedicated resources, a dedicated resource of an MVNO having a greatest borrow variable is borrowed and allocated.

6. The method of claim 4, wherein the dedicated resource is borrowed and allocated preferentially to an MVNO of which the borrow variable is small in comparison with an MVNO of which the borrow variable is great.

7. The method of claim 4, wherein, after the updating of the borrow variable for each MVNO, if unscheduled BE traffic exists, common resources remaining after being allocated to the QoS traffic are allocated to the BE traffic by considering proportional allocation among MVNOs.

8. The method of claim 7, wherein the common resource for the BE traffic is allocated by applying a scheduling weight that is in inverse proportion to the borrow variable.

9. The method of claim 8, wherein the common resource is allocated preferentially to an MVNO of which the borrow variable is small in comparison with an MVNO of which the borrow variable is great.

10. The method of claim 1, wherein a unit of the resource allocation comprises at least one of a symbol and a slot.

11. The method of claim 10, wherein the number of dedicated resources for each MVNO is defined by: $N_k=N*\gamma_k*\alpha$,
wherein N denotes at least one of the number of available symbols and the number of available slots in one frame, $\gamma_k$ denotes a resource allocation ratio of a $k^{th}$ MVNO, $\alpha$ is a constant less than 1, and $$\sum_k (\gamma_k) = 1.$$

12. The method of claim 11, wherein the number of common resources is defined by: $Ns=N*(1-\alpha)$.

13. The method of claim 11, wherein, in DownLink (DL), the value N is determined by subtracting the at least one of the number of symbols and slots for a DL overhead from the at least one of the number of all symbols and slots of a DL subframe, and in Uplink (UL), the value N is determined by subtracting the at least one of the number of symbols and slots for a UL overhead from the at least one of the number of all symbols and slots of a UL subframe.

14. The method of claim 13, further comprising determining the value $\alpha$ by considering the DL overhead and the UL overhead.

15. The method of claim 13, wherein the DL overhead comprises at least one of a preamble and a signaling traffic for transmitting a broadcast message, and the UL overhead is a UL control channel.

16. An apparatus for scheduling proportional resource allocation among Mobile Virtual Network Operators (MVNOs), the apparatus comprising:
a Connection Admission Control (CAC) processor for determining whether to admit new calls or handover calls; and
a scheduler, only with respect to admitted calls, for allocating for each MVNO a dedicated resource of each MVNO to Quality of Service (QoS) traffic in consideration of priorities, for determining for each MVNO a presence or absence of unscheduled QoS traffic, and for allocating for MVNOs, each of which has the unscheduled QoS traffic, a common resource shared by all MVNOs to the unscheduled QoS traffic in consideration of priorities without distinguishing each MVNO.

17. The apparatus of claim 16, wherein, for remaining MVNOs each of which does not have the unscheduled QoS traffic, the scheduler allocates a dedicated resource of each remaining MVNO to Best Effort (BE) traffic for each remaining MVNO.

18. The apparatus of claim 17, wherein, if further unscheduled QoS traffic exists, the scheduler borrows and allocates dedicated resources of other MVNOs having unused dedicated resources to the unscheduled QoS traffic in consideration of priorities.

19. The apparatus of claim 18, wherein, after borrowing and allocating the dedicated resources, the scheduler updates a borrow variable for each MVNO by increasing the borrow variable by the number of borrowed resources as to an MVNO that borrows the dedicated resources of other MVNOs and by decreasing the borrow variable by the number of lent resources as to an MVNO that lends a dedicated resource of that MVNO.

20. The apparatus of claim 19, wherein the scheduler borrows and allocates a dedicated resource of an MVNO having a greatest borrow variable.

21. The apparatus of claim 19, wherein the dedicated resource is borrowed and allocated preferentially to an MVNO of which the borrow variable is small in comparison with an MVNO of which the borrow variable is great.

22. The apparatus of claim 19, wherein, after the updating of the borrow variable for each MVNO, if unscheduled BE traffic exists, the scheduler allocates common resources, which remain after being allocated to the QoS traffic, to the BE traffic by considering proportional allocation among MVNOs.

23. The apparatus of claim 22, wherein the common resource for the BE traffic is allocated by applying a scheduling weight that is in inverse proportion to the borrow variable.

24. The apparatus of claim 23, wherein the common resource is allocated preferentially to an MVNO of which the borrow variable is small in comparison with an MVNO of which the borrow variable is great.

25. The apparatus of claim 16, wherein a unit of the resource allocation comprises at least one of a symbol and a slot.

26. The apparatus of claim 25, wherein the number of dedicated resources for each MVNO is defined by: $N_k=N*\gamma_k*\alpha$,
wherein N denotes at least one of the number of available symbols the number of available slots in one frame, $y_k$ denotes a resource allocation ratio of a $k^{th}$ MVNO, $\alpha$ is a constant less than 1, and $$\sum_k (\gamma_k) = 1.$$

27. The apparatus of claim 26, wherein the number of common resources is defined by: $Ns=N*(1-\alpha)$.

28. The apparatus of claim 26, wherein, in DownLink (DL), the value N is determined by subtracting the at least one of the number of symbols and slots for a DL overhead from the at least one of the number of all symbols and slots of a DL subframe, and in Uplink (UL), the value N is determined by subtracting the at least one of the number of symbols and slots for a UL overhead from the at least one of the number of all symbols and slots of a UL subframe.

29. The apparatus of claim 28, wherein the value $\alpha$ is determined by considering the DL overhead and the UL overhead.

30. The apparatus of claim 28, wherein the DL overhead comprises at least one of a preamble and signaling traffic for transmitting a broadcast message, and the UL overhead comprises a UL control channel.

* * * * *